(12) United States Patent  
Bayeur et al.

(10) Patent No.: US 6,700,220 B2
(45) Date of Patent: Mar. 2, 2004

(54) REMOTE CONTROL PASS-KEY MODULE FOR ANTI-THEFT SYSTEM EQUIPPED VEHICLES AND INSTALLATION METHOD

(75) Inventors: Richard Bayeur, Laplaine (CA); Christian Coutu, St-Ambroise de Kildaire (CA)

(73) Assignee: Accessories Electroniques Bomar Inc., Montreal (CA)

( * ) Notice: Subject to any disclaimer, the term of this patent is extended or adjusted under 35 U.S.C. 154(b) by 0 days.

(21) Appl. No.: 10/160,975

(22) Filed: May 30, 2002

(65) Prior Publication Data

US 2003/0222500 A1 Dec. 4, 2003

(51) Int. Cl.[7] .......................... B60R 25/00; B60R 25/10; F02N 11/08
(52) U.S. Cl. .................. 307/10.2; 123/179.2; 340/425.5
(58) Field of Search ............................... 307/10.2, 10.5, 307/10.6, 10.3, 10.4, 10.1, 10.16; 340/825.3, 425.5, 825.69, 825.73, 5.23, 5.28, 5.67; 123/179.1, 179.2, 179.3

(56) References Cited

U.S. PATENT DOCUMENTS

| | | | |
|---|---|---|---|
| 5,184,584 A | 2/1993 | Cantrell | 123/179.2 |
| 5,555,863 A | 9/1996 | Kokubu | 123/179.3 |
| 5,612,578 A * | 3/1997 | Drew | 307/10.5 |
| 5,757,086 A * | 5/1998 | Nagashima | 307/10.6 |
| 5,818,330 A | 10/1998 | Schweiger | 340/426 |
| 5,838,255 A | 11/1998 | Di Croce | 340/825.69 |
| 5,995,013 A | 11/1999 | Yoshizawa et al. | 340/825.31 |

* cited by examiner

Primary Examiner—Rajnikant B. Patel
(74) Attorney, Agent, or Firm—Harrington & Smith, LLP

(57) ABSTRACT

A pass-key electronic module is provided for enabling remote control of a function in a motor vehicle equipped with a key identity code verifying anti-theft system, under control of a vehicle control unit connected to a key identity code receiving sensor through a data communication link and an enable line. The module comprises (a) a communication circuit enabling communication with the vehicle control unit through the data communication link, (b) an input receiver circuit for receiving a command signal from a remote control system controller, (c) a switching circuit for disabling the sensor from communicating with the vehicle control unit upon sensing of the command signal through the input circuit, and (d) a memory circuit storing an operating program and an identity code subject to validation by the vehicle control unit.

21 Claims, 10 Drawing Sheets

REMOTE CONTROL PASS-KEY MODULE FOR ANTI-THEFT SYSTEM EQUIPPED VEHICLES AND INSTALLATION METHOD

FIELD OF THE INVENTION

The present invention relates to vehicle remote starting systems, and more particularly, to electronic circuitry for bypassing the electronic anti-theft system of a vehicle to permit starting of the engine from a remote location. The electronic module of the present invention will be referred to as an electronic pass-key module (PK module) throughout the description.

BACKGROUND OF THE INVENTION

Vehicle manufacturers are installing anti-theft systems on many vehicles. Some of them are now relying on the wireless transmission of a coded signal from a transponder embedded into the grip of the mechanical ignition key, thus providing an electronic key, in order to enable starting of the engine and driving of the vehicle. Typically, to drive the vehicle the electronic key is inserted into the ignition cylinder and the electronic ID code is read by a short range transceiver usually located near the ignition cylinder. The transceiver then communicates the ID code to a vehicle electronic control unit (VCU) for validation and enabling of engine starting. Such a feature obviously helps deterring theft since the driver must be in possession of an ignition key with a compatible mechanical code plus a valid electronic ID code to be communicated to the vehicle control unit to activate the vehicle functions and drive away with the vehicle. Usually, these systems are first initialised by teaching the vehicle control unit the transponder ID code of an associated ignition key and thereafter require that same ID code to be communicated to the control unit to enable vehicle operation. Examples of such anti-theft systems are described in U.S. Pat. No. 5,555,863 delivered to Kokubu in 1996 and U.S. Pat. No. 5,818,330 granted to Schweiger in 1999.

Some variations to the above concept are known but all consist in communicating an electronic ID signal to a control unit in order to enable engine starting. For instance, in U.S. Pat. No. 5,184,584 (Cantrell—1993) and U.S. Pat. No. 5,612,578 (Drew—1997), an electrically resistive pellet is embedded into the ignition key and the ID signal is determined by the resistance value.

It shall be pointed out that in most of these systems, the vehicle engine can be started if one knows the ignition key electronic ID code and can communicate it to the vehicle control unit, while providing an electronic circuitry to control the vehicle function as in any common remote starting system. To drive the vehicle, however, the key must still be introduced into the ignition cylinder to activate the ignition switch and let the vehicle control unit (VCU) take over full vehicle control.

Resistive coded anti-theft systems can be bypassed relatively easily to enable remote engine starting as described U.S. Pat. Nos. 5,184,584 and 5,612,578. One merely has to measure and mimic the appropriate resistor value with a fixed or variable resistor connected to the input connector to bypass the anti-theft system and enable engine starting. Transponder based systems are much more difficult to bypass since it is practically impossible to read the key ID code. Therefore, only the vehicle or anti-theft system manufacturer can provide a system in which a given start enabling coded signal can be transmitted by either the ignition key transponder or a remote transmitting unit to enable starting of the engine from a distance without trigging the anti-theft system, as provided for instance in U.S. Pat. No. 5,818,330. In order to provide a still higher level of reliability, at least one vehicle manufacturer (Nissan) is using a dual electronic code protocol in addition to the usual mechanical coding of the ignition key. The vehicle control unit communicates a random password to be memorised by the ignition key transponder every time the ignition is cut-off. To start the engine the next time, the key must be inserted properly into the ignition cylinder, then the key ID code is verified and the transponder is finally asked by the VCU to communicate the last password received. Since that password is random and is only known by the VCU and the key transponder, a very high level of safety is thereby achieved.

The aforementioned systems are performing so efficiently that they cause a major problem to remote starter manufacturers and installers trying to retrofit a remote starting system on vehicles equipped with such transponder based anti-theft systems. Indeed, they must find a way to bypass the verification routine of the VCU and/or the transceiver, or mimic the coded signal and the possible password normally transmitted by the ignition key transponder to start the engine successfully. That shall be accomplished while preserving the normal operation and performance of the theft-deterrent system of the vehicle.

Most available solutions to the above problem merely reside in providing the vehicle control unit with a mimic of the signal normally communicated by the ignition key transponder. A basic way to do that is to use a valid electronic ignition key (mechanical code plus transponder) dissimulated in the vehicle and inductively coupled to the transceiver unit of the key cylinder assembly through induction coils and a relay contact. Therefor, when the remote starting system is activated through the remote transmitter, the relay is energised and the spare key becomes inductively coupled to the transceiver that can read the ID code transmitted from the key transponder and communicate it or a confirmation signal upon request from the VCU to enable engine starting. That technique suffers from three main drawbacks: 1) an expensive transponder coded key must be purchased from the vehicle manufacturer and validated by the vehicle control unit, 2) it is relatively easy for a thief, to find the hidden key and merely disconnect it and use it normally in the ignition cylinder to drive away with the vehicle, which practically eliminates the usefulness of the anti-theft system, if not worse, and 3) the installation is critical for proper operation; the key must be installed as near as possible to the key cylinder transceiver, the coils must be wound carefully and precisely and nevertheless the risks of malfunction remain high.

There is thus a need for an electronic pass-key module (PK module) which can be used to retrofit a remote starting system on a transponder based anti-theft system equipped vehicle, without adversely affecting the normal operation and reliability of said anti-theft system.

SUMMARY OF THE INVENTION

More specifically, in accordance wits the invention, there is provided a pass-key electronic module for enabling remote control of a function of a motor vehicle equipped with a key identity code verifying anti-theft system under control of a vehicle control unit connected to a key identity code receiving sensor through a data communication link and an enable line, comprising:

(a) a communication circuit enabling communications with the vehicle control unit through the data communication link;

(b) an input receiver circuit for receiving a command signal from a remote control system controller;

(c) a switching circuit for disabling the sensor from communicating with the vehicle control unit upon sensing of the command signal through the input circuit; and (d) a memory circuit storing an operating program and an identity code subject to validation by the vehicle control unit.

The present invention also relates to a method for enabling remote control of a function in a motor vehicle equipped with a key identity code verifying anti-theft system under control of a vehicle control unit connected to a key identity code receiving sensor through a data communication link and an enable line, said method comprising:

(a) providing a pass-key electronic module with communication and switching capability, in which an identity code is memorized;

(b) connecting said pass-key module for communication with the vehicle control unit through the communication data link;

(c) connecting the pass-key module in series with the sensor enable line for controlled switching of the line;

(d) communicating the identity code to the vehicle control unit for validation of the identity code; and (e) connecting the module to a remote control system controler output so that when a command signal is generated by the controller, the module switches the key identity code sensor enable line open, thus disabling the sensor, and communicates the validated identity code to the vehicle control unit which then enables a function in the vehicle.

The foregoing and other objects, advantages and features of the present invention will become more apparent upon reading of the following non restrictive description of illustrative embodiments thereof, given by way of example only with reference to the accompanying drawings.

BRIEF DESCRIPTION OF THE DRAWINGS

In the appended drawings:

FIG. 9 is a detailed circuit schematic of the third illustrative embodiment of the remote starter pass-key module of the present invention, pursuant to FIGS. 7 and 8.

Similar reference numerals refer to similar parts throughout the various Figures.

DETAILED DESCRIPTION OF THE DRAWINGS

Illustrative embodiments of the remote starter module for anti-theft system equipped vehicles according to the present invention will now be described in detail referring to the appended drawings.

Figure 1:
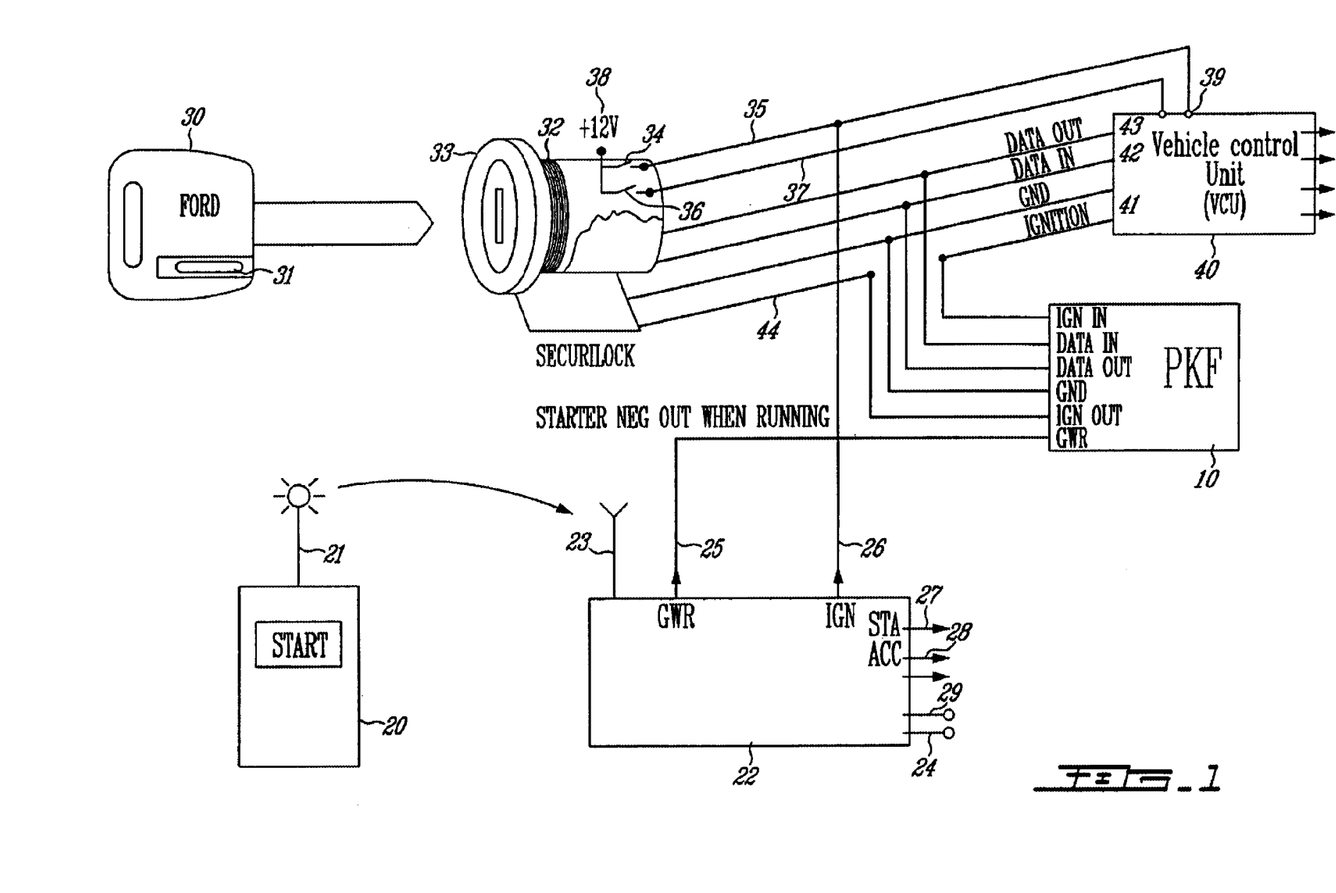
FIG. 1 is a block circuit diagram showing the interconnection between a first illustrative embodiment of the pass-key module of the present invention, the remote starting system controller and the transponder based anti-theft system of a motor vehicle.

Referring to FIG. 1, there is illustrated a typical system installation for a Ford vehicle, comprising the electronic pass-key module 10 cooperating with a conventional remote starting system and a transponder based anti-theft system (SECURILOCK). The conventional remote starting system comprises a remote transmitter 20 provided with an antenna 21, and a controller 22 installed in the vehicle and comprising an antenna 23 and a plurality of inputs and outputs including at least a 12V supply 24, a GWR (ground when running) output 25, an ignition output 26, a brake-on input 29, a starter output 27 and an accessory output 28. The SECURILOCK anti-theft system comprises an electronic key 30 provided with a transponder 31, a transceiver unit 32 incorporated into the key cylinder assembly 33, and a vehicle control unit (VCU) 40 in communication with transceiver unit 32. The key cylinder assembly 33 also includes at least an ignition switch 34 connected to an ignition wire 35, a drive switch 36 connected to a drive wire 37, and a 12V supply wire 38.

The Ford SECURILOCK anti-thief system basically functions as follows. When a vehicle user introduces the electronic key 30 into key cylinder assembly 33 and selects the ignition position, the steering lock is released and the ignition switch 34 is closed connecting the 12V supply 38 to ignition wire 35 connected to the ignition input 39 of VCU 40. Upon reception of an ignition signal, VCU unit 40 returns a 12V ignition supply through wire 41 (connected to wire 44 when the PK module 10 is not present or activated) to activate transceiver unit 32. VCU 40 then enters into communication with transceiver unit 32 through data wires 42 and 43. The transceiver unit 32 is then put into wireless communication with key transponder 31 requesting transmission of a key code signal then communicated to the VCU 40 through data-out wire 43. VCU 40 compares the key code signal with the valid key codes stored into its memory and sends the appropriate outputs to start the engine if the received code matches one of the memory stored valid codes. Therefore, to start the engine, a user must be in possession of an electronic key 30 comprising a mechanical code permitting introduction into the key cylinder assembly 33 and a transponder 31 with an electronic code known by the VCU 40. When the engine starts running, the key 30 is then set to the drive position of the key cylinder 33, closing drive switch 36 and sending a 12V signal to VCU 40 through wire 37, thus cutting-off the power to the starter while enabling the necessary functions to drive the vehicle.

That type of system features a programming function to enter new key codes for future use. The procedure requires two different valid keys to be inserted into the cylinder assembly 33 within a certain time delay. That puts the VCU 40 into programming mode so that the code of a third key inserted again within a certain delay is memorised by the VCU 40 and will then be considered a valid key code for starting the vehicle. It shall be noted that the SECURILOCK system requires a valid key code to start the engine, but once the engine is running, there is no further restriction than using a valid mechanical key to allow driving of the vehicle.

When a user wishes to start the vehicle from a distance, no key is inserted into the cylinder assembly 33; the validation procedure must then be fooled using the electronic pass-key module 10 of the present invention. As stated above, PK module 10 is designed to be used in co-operation with any existing remote starting system such as illustrated in FIG. 1, provided that the system's controller 22 is equipped with a GWR output 25, which is a very common feature. Since it is not possible to know the codes of the valid existing electronic keys for a vehicle, there is no possibility to merely mimic one of those codes already stored in the memory of VCU 40 and requested by it to enable starting of the engine. However, the communication protocol between the VCU 40 and the transceiver unit 32 is known and common to most if not all of the SECURILOCK anti-theft systems installed. Therefore, PK module 10 is designed to communicate with VCU 40 with the same communication protocol as the transceiver unit 32, and has its own ID code in the same format as a key transponder ID code. Accordingly, PK module 10 must be installed in a vehicle using a special method.

Firstly, the PK module 10 and the remote starting system controller 22 are hooked-up as indicated in FIG. 1. Secondly, referring to the new key code programming procedure described above, two valid keys are required and must be inserted in the cylinder assembly 33 with the appropriate sequence to initiate the programming state of VCU 40. Thirdly, within the allowed time delay, the GWR line 25 is activated (short to ground) which enables PK module 10 and disables transceiver unit 32 by disconnecting wire 44 from wire 41. The VCU 40 then requests the PK module 10 to communicate the key ID code, at which time the PK module 10 communicates its own ID code thus being stored in memory and validated by the VCU 40 for future recognition. The GWR wire 25 can then be disconnected from the ground to resume normal operation of the anti-theft system. The initialisation procedure is now complete and the PK module 10 can be used to permit starting of the engine without an electronic key through activation of the GWR line 25 before the beginning of the verification procedure of VCU 40. Therefore, the PK module 10 can co-operate with a common remote starting system as follows to allow a user to start the engine from a remote location.

The user depresses a switch button on remote transmitter 20 and a coded signal is transmitted from antenna 21 to base unit 22 of the conventional remote starting system through antenna 23. It is also a common practice to incorporate such a transmitter and antenna into the grip of a mechanical key. After recognition and validation of the transmitter code, the base unit 22 sends a continuous low electrical signal at the GWR output 25 connected to the GWR input of PK module 10, which immediately causes disconnection of wire 44 from wire 41 according to the electronic circuitry in module 10 (See FIG. 3). The base unit 22 then sends a 12V supply at its ignition output 26 connected to ignition wire 35 and ignition input 39 of VCU 40. Then, VCU 40 senses the 12V ignition signal and returns a 12 V signal on wire 41, trying to energise transceiver 32 to establish communication, but actually only triggering the PK module 10 which intercepts and blocks the signal. At that time the VCU 40 enters into communication with the PK module 10, which responds with the appropriate communication protocol. The VCU 40 then requests a key ID code. The PK module 10 transmits its own ID code which is validated by the VCU 40 since it has been previously programmed into its memory as a new key code at the time of the installation of the PK module 10, according to the aforementioned specific procedure. The VCU 40 being satisfied with the response then enables the engine starting functions, permitting effective engine starting under the control of the remote starter controller 22, namely activating the vehicle starter through its starter output 27.

According to the above procedure, the transceiver 32 has been totally disconnected and replaced with PK module 10 for the purpose of communicating a valid key code to the VCU 40. Therefore, to drive away with the vehicle, a user merely has to use a key which is mechanically compatible with key cylinder assembly 33, which includes of course the original electronic transponder key 30. The key is inserted into the cylinder assembly 33 to select the drive position and close the drive switch 36. When the brake pedal is depressed, the brake input 29 on the base unit 22 is activated, which in turn takes the GWR output 25 back to a Hi status and turns the controller 22 off, thus returning the full control to VCU 40 and transceiver unit 32 until the next remote starting command.

It is worth mentioning that the theft deterring performance of the anti-theft system is not significantly affected by the use of the PK module 10 since 1) one still needs a coded ID signal from a valid transmitter 20 provided by the remote starting system to start the vehicle. 2) Access to the GWR wire 25 can be mechanically restricted by using wires of the same colour taped together and no identification indicia on controller 22. Indeed, it is a well known characteristic of all remote starting systems to enable starting of the engine by shorting the GWR wire 25 to ground. Therefore, the same usual precautions shall apply when such a system is used in co-operation with the PK module 10 of the present invention.

The operation of the PK module 10 described above will now be described in detail referring to FIGS. 2 and 3.

Figure 3:
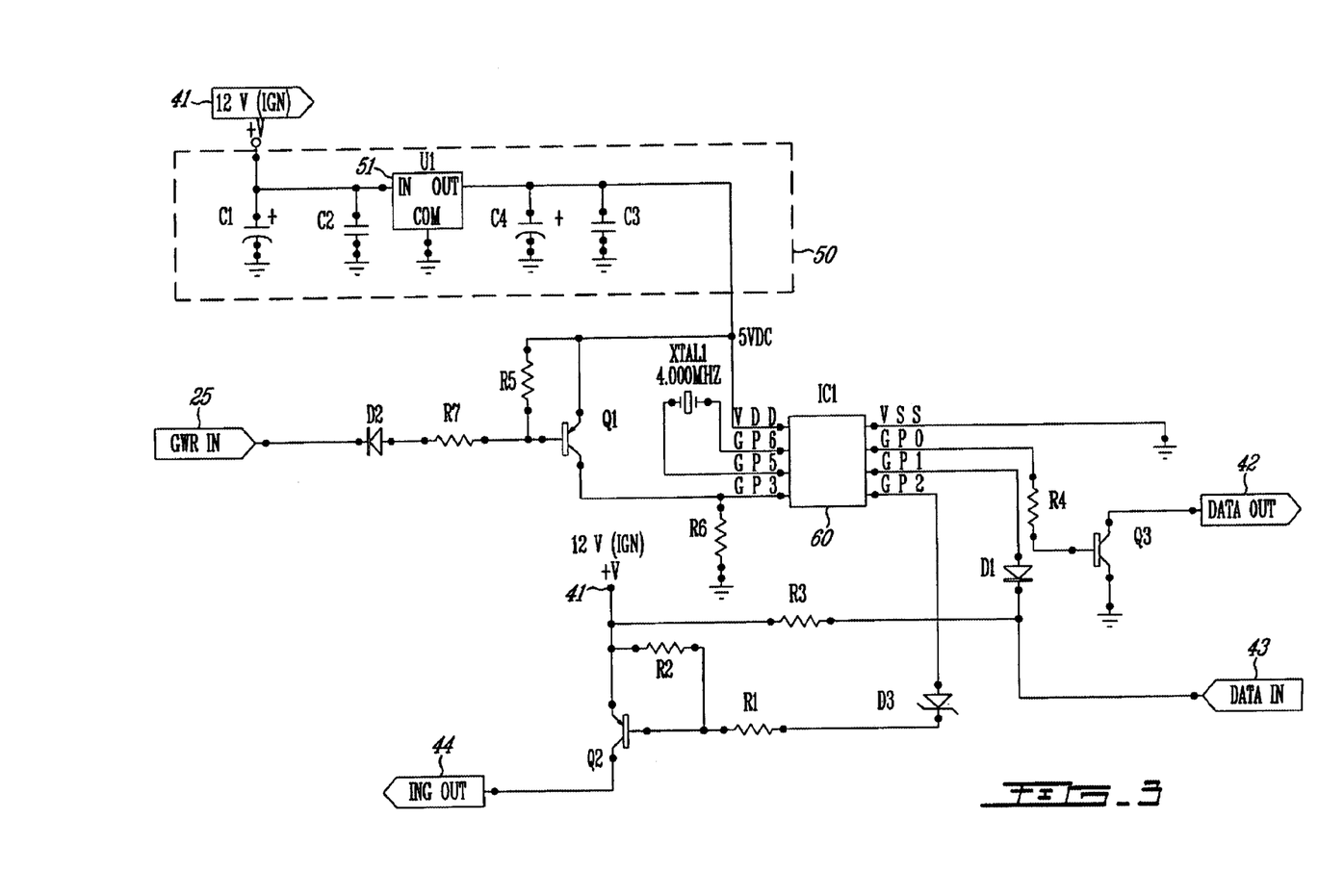
FIG. 3 is a detailed circuit schematic of the first illustrative embodiment of the remote starter pass-key module of the present invention pursuant to FIGS. 1 and 2.

The structure of the PK module 10 is relatively simple as illustrated in FIG. 3. The circuit basically comprises a power supply section 50, a programmable integrated controller (PIC) 60 connected to a crystal providing the clock time basis to pins P4 and P5 of PIC 60, and input and output interfacing components. The power supply section receives the 12V supply from the ignition output 41 of VCU 40 (see FIG. 1) and uses a 5V voltage regulator 51 with upstream and downstream capacitors to provide a 5V regulated voltage supply to PIC 60.

The GWR output 25 from controller 22 normally supplies a 12V signal to the cathode of diode D2 avoiding transmission of the signal to the 5V PIC circuit. When the GWR line 25 switches to a Lo logic status upon reception of an engine start signal by controller 22, PNP transistor Q1, resistors R5 and R7 and pull down resistor R6 provide a sharp Lo signal to input P3 of PIC 60, bypassing diode D2 to avoid excessive potential difference between pin P3 and the common (VSS pin). voltage drop. The data input 43 from an open collector transistor in VCU 40 is received in the PK module through a pull-up resistor R3 connected to the 12V ignition input and reverse diode D1 isolating the 12V signal from the 5V PIC circuit. Data is communicated by the VCU 40 by switching the open collector transistor to ground, thus providing Lo pulses to input pin,P3 of PIC 60.

Similarly, PIC 60 communicates with VCU 40 through output pin P0, base resistor R4 and open collector transistor Q3 sending a train of Lo pulses to the VCU data input 42. Finally, output P2 of PIC 60 provides the ignition out signal to wire 44 through zener diode D3, PNP transistor Q2 and resistors R1 and R2. Since the emitter of transistor Q2 is connected to the 12V ignition input 41, the 12V ignition signal from wire 41 is normally redirected to the transceiver unit 32 through wire 44 (FIG. 1) because pin P2 of PIC 60 is set Lo so that the difference between the 12V ignition supply and the Zener voltage (typically set to approximately 9V) allows conduction in transistor Q2. However, when a Lo GWR input signal 25 indicates a remote starting condition, Pin P2 of PIC 60 is set Hi to 5V which added to the zener voltage exceeds the 12V supply. Therefore, conduction in transistor Q2 is not allowed, thus disconnecting wires 41 and 44 and disabling transceiver unit 32.

Figure 2:
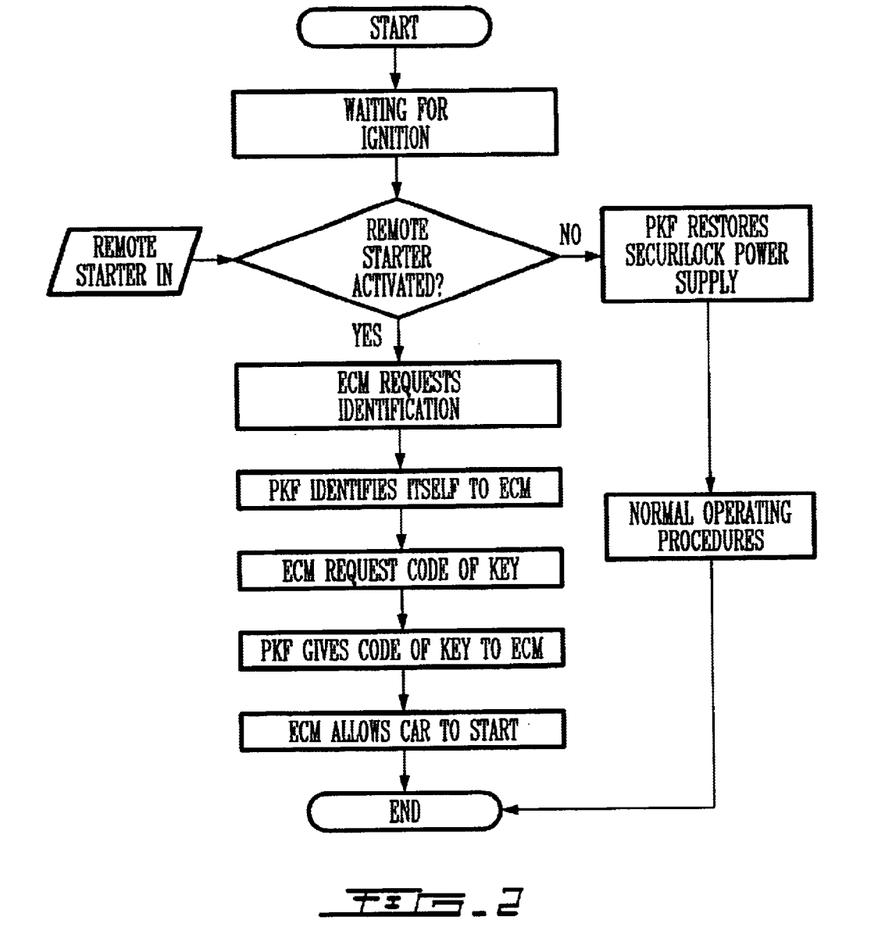
FIG. 2 is a flow diagram showing the algorithm of operation of the first illustrative embodiment of the remote starter pass-key module of the present invention illustrated in FIG. 1.

Referring to FIGS. 2 and 3, the algorithm followed by PIC 60 is as follows:

The PK module 10 is dead until a 12V ignition signal appears at input 41. When an ignition signal is sensed, the PIC verifies the status of GWR input 25. If the input is Hi, ignition is being carried out using the key and the PK module simply redirects the ignition signal 41 to the transceiver unit 32 and waits until cut-off of the ignition. Otherwise, a Lo at GWR input 25 means a remote starting condition and PK nodule 10 does not activate ignition output 44 to transceiver unit 32. The module then waits for a prompt from VCU 40 on data line 43 and confirms its presence through the appropriate handshaking protocol on data line 42. The VCU then asks for the key ID code. The PIC responds by transmitting its own ID code, previously programmed into the memory of VCU 40 according to the special initialisation procedure described above. The ID code is thus compared and accepted by VCU 40 which enables engine starting. PK module 10 then waits for cut-off of the ignition for reset and will resume operation at the next ignition signal.

In an alternative, illustrative embodiment of the PK module 10 of the present invention, the module is carrying a changing password to be communicated to VCU 40 in addition to or in lieu of a fixed ID code. As an example, operation of the PK module with a Nissan anti-theft system illustrated in FIGS. 4 to 6 will be described hereinafter.

Figure 4:
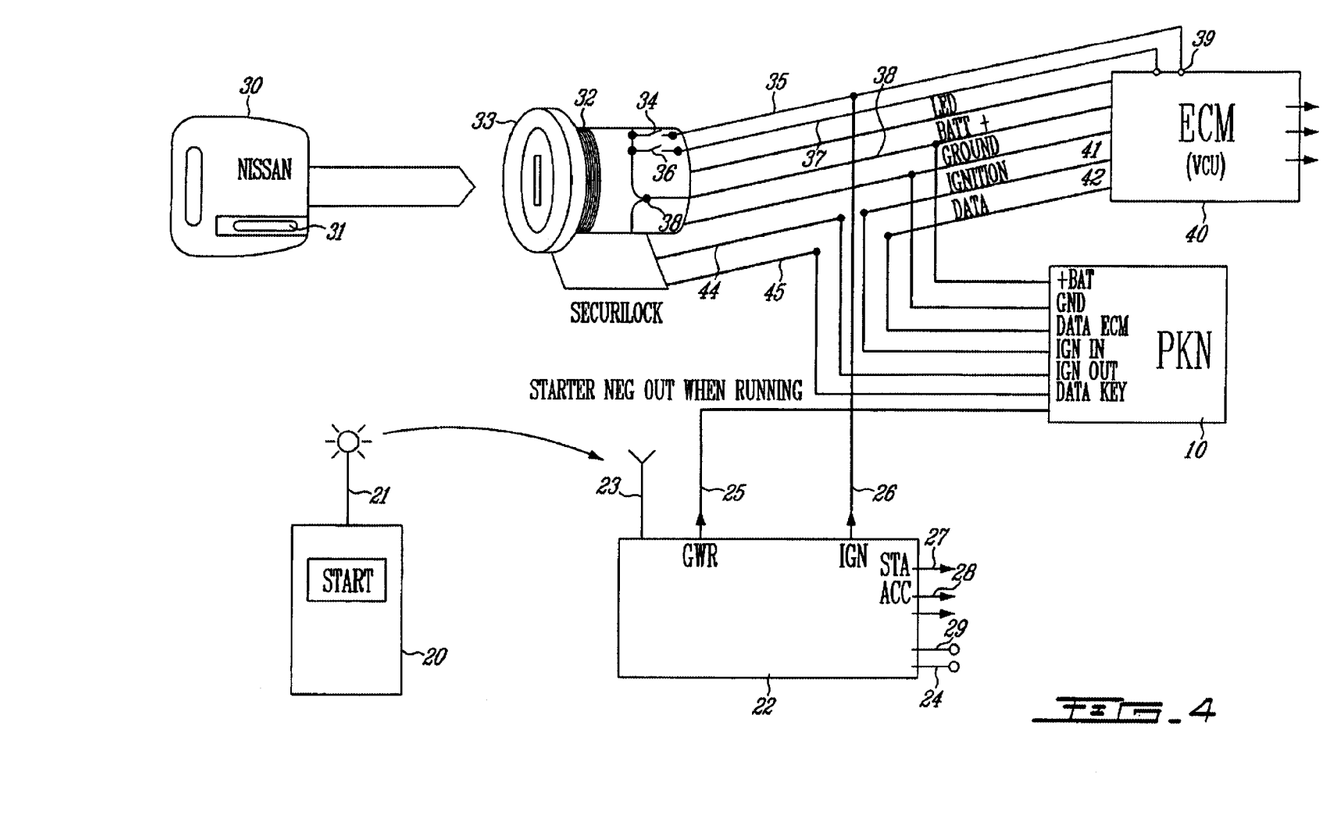
FIG. 4 is a block circuit diagram showing the interconnection between a second illustrative embodiment of the pass-key module of the present invention, the remote starting system controller and the transponder based anti-theft system of a motor vehicle using a variable password as part of the identity verification protocol.

The Nissan anti-theft system can be schematically represented referring to FIG. 4, which is very similar to FIG. 1 as most changes involve the communication protocol and data transmissions.

In the Nissan anti-theft system, more autonomy is implemented into the transceiver unit 3Z, such that all communications necessary to verify the ID code of the key transponder are handled by the transceiver itself. However, a further level of verification is taking place between the transceiver unit 32 and VCU 40. Indeed, every time the VCU 40 is instructed to cut-off the ignition, it sends a password to the transceiver for storage into the memory of key transponder 31. The following protocol is thus taking place when the key 30 is inserted into cylinder assembly 33 and set to the ignition position. The transceiver 32, energised through ignition wires 41 and 44, verifies the ID code of transponder 31 and finally asks for transmission of the stored password. It then initiates communication through proper protocol with VCU 40 on data line 42 to acknowledge ID code verification and transmit the password. VCU 40 then proceeds to password verification and enables engine starting if it matches the last transmitted password.

Figure 5A:
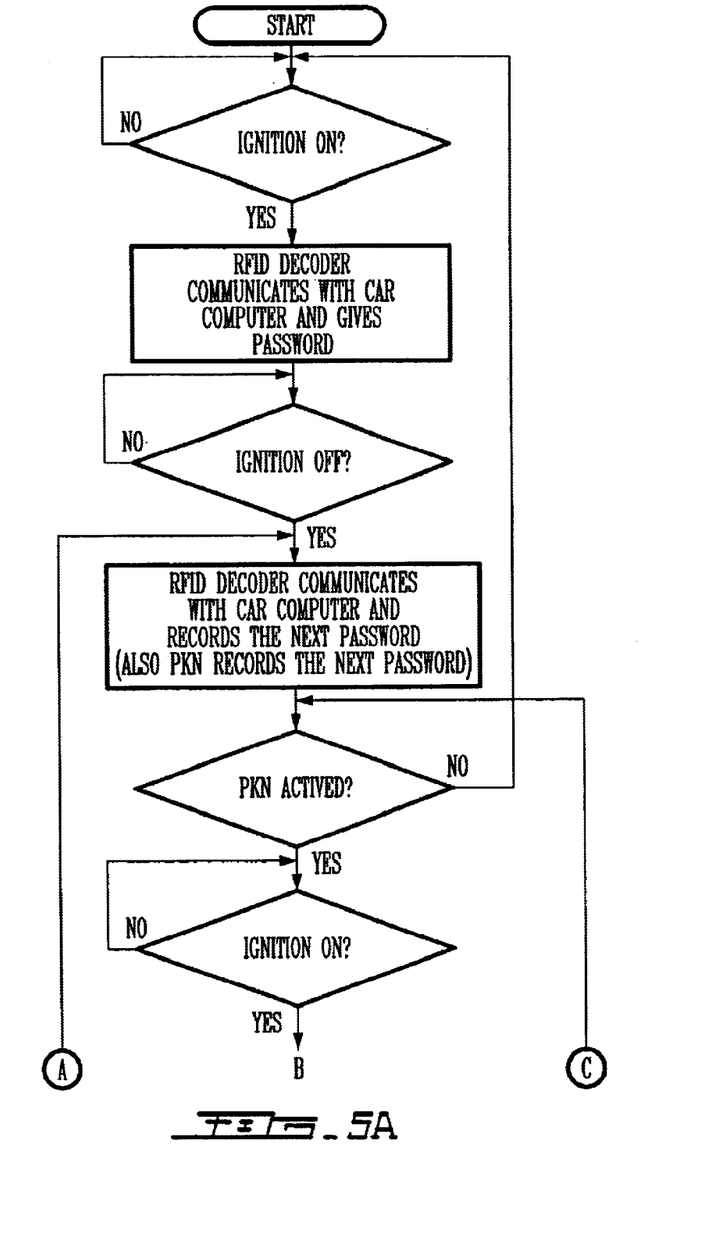
FIGS. 5a and 5b are a flow diagram showing the logical algorithm of operation of the second illustrative embodiment of the remote starter pass-key module of the present invention, illustrated in FIG. 4.
Figure 5B:
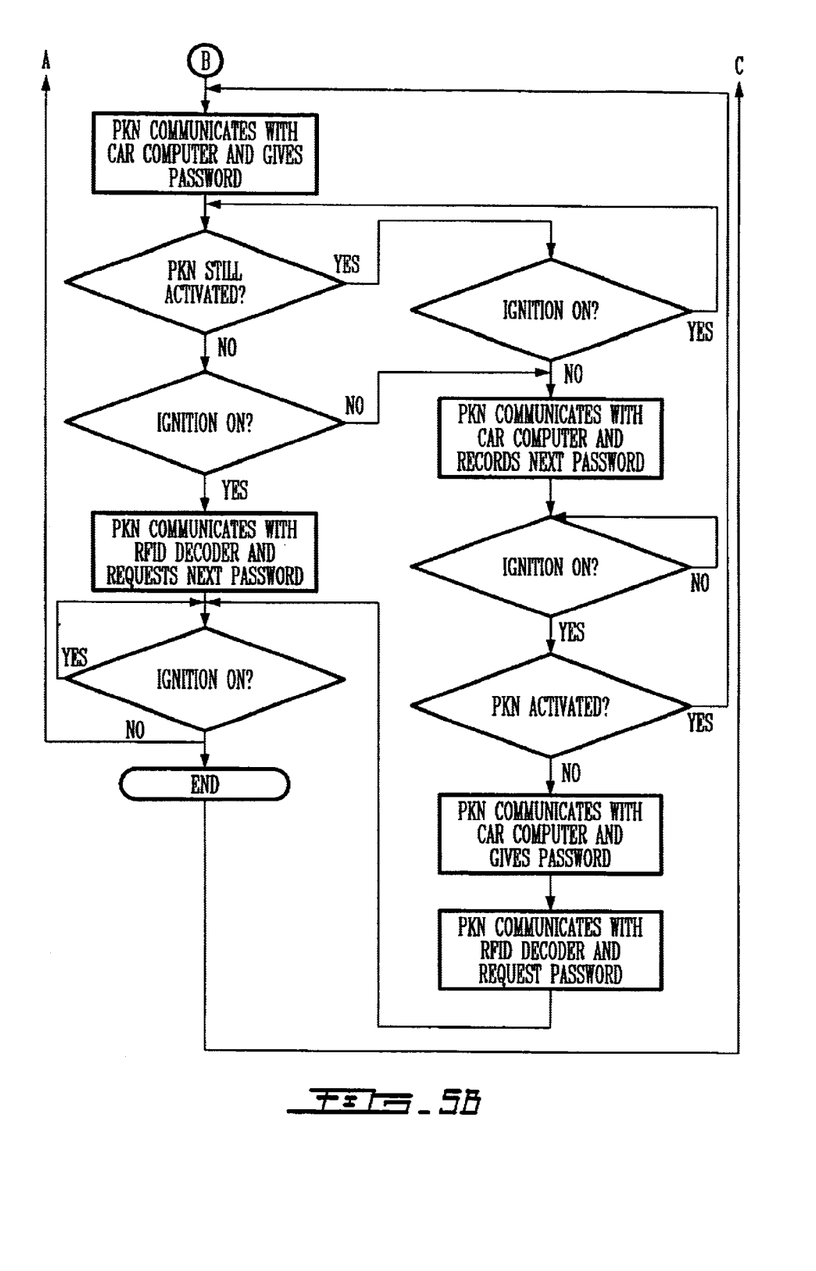
Figure 6:
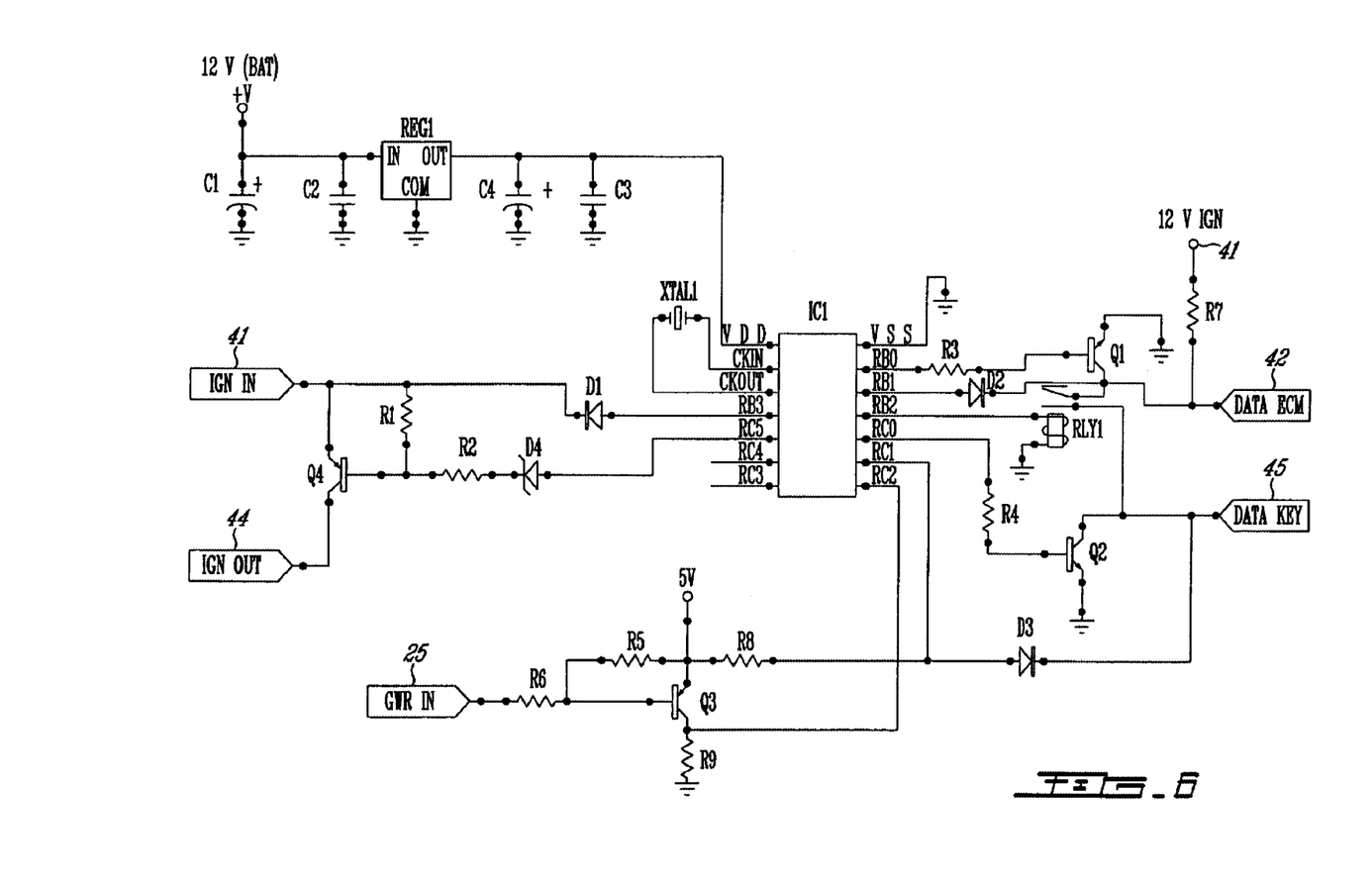
FIG. 6 is a detailed circuit schematic of the second illustrative embodiment or the remote starter pass-key module of the present invention, pursuant to FIGS. 4 and 5.

In such a case, it is not necessary for PK module 10 to possess an ID code. However, it shall be able to monitor the communications between VCU 40 and transceiver 32 and memorise the password when it is being transmitted on data line 42. FIGS. 5a, 5b and 6 respectively illustrate the algorithm and the circuit schematic of the PK module for the Nissan anti-theft system.

When an engine start signal is transmitted by transmitter 20 to controller 22, the resulting activation of GWR output 25 causes. PK module 10 to interrupt ignition supply to the transceiver 32 through wire 41, The algorithm of the PIC 60 is thus so modified to initiate communication with VCU 40, acknowledge ID code verification and communicate the last password gathered on communication line 42 and memorised. Upon reception of this information, VCU 40 enables engine starting. Although pass-key module 10 knows the password and engine is running, when the electronic key is inserted into the cylinder to drive the vehicle, pass-key module 10 asks the transceiver 31 for communication of the password in lieu of VCU 40 to comply with the transceiver protocol and avoid an error status. When pass-key module 10 is not activated through GWR line 25, lines 41 and 44 are connected together through relay RLY 1, for normal communication between transceiver 31 and VCU 40.

Figure 7:
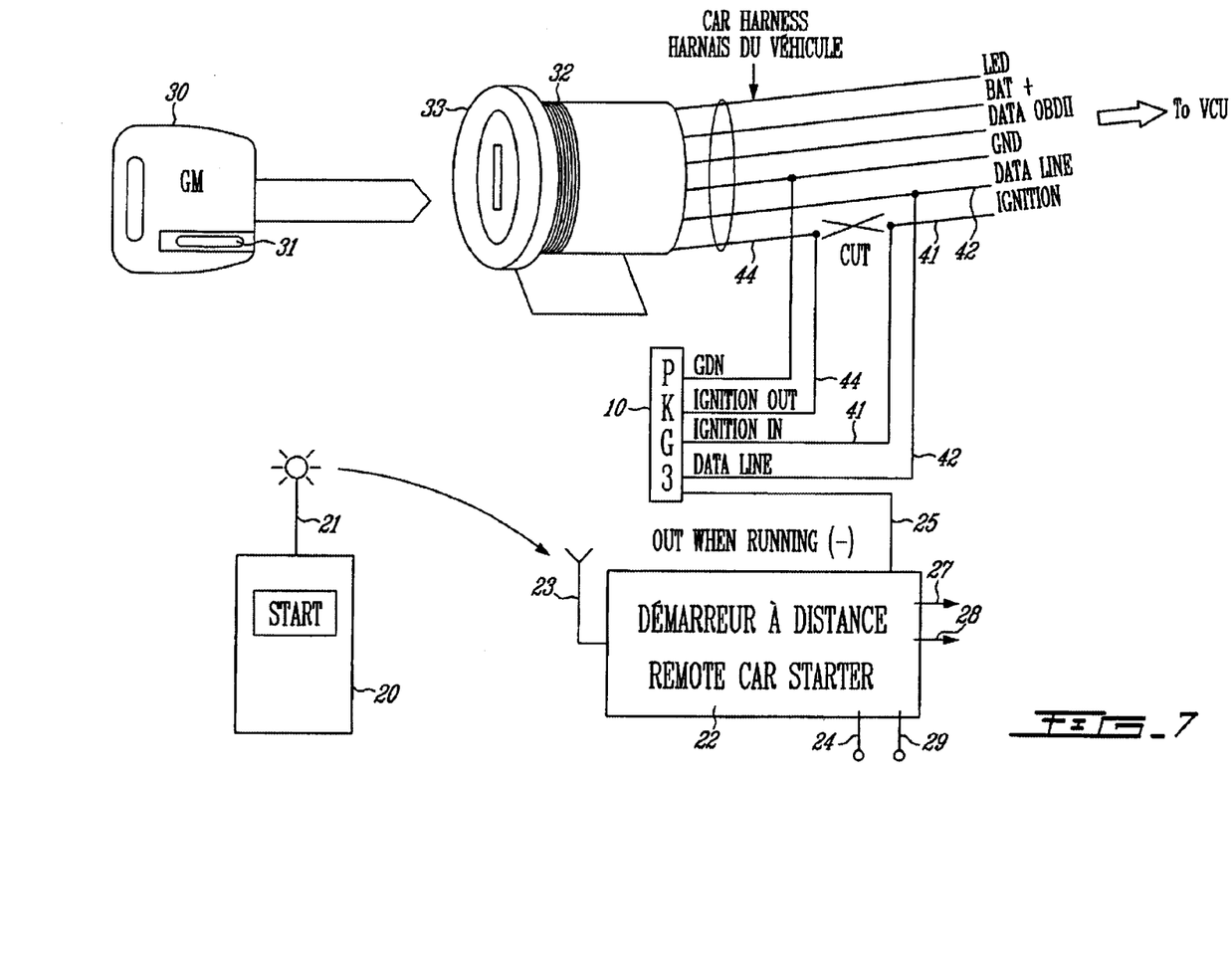
FIG. 7 is a block circuit diagram showing the interconnection between a third illustrative embodiment of the pass-key module of the present invention, the remote starting system controller and the transponder based anti-theft system of a motor vehicle.
Figure 8:
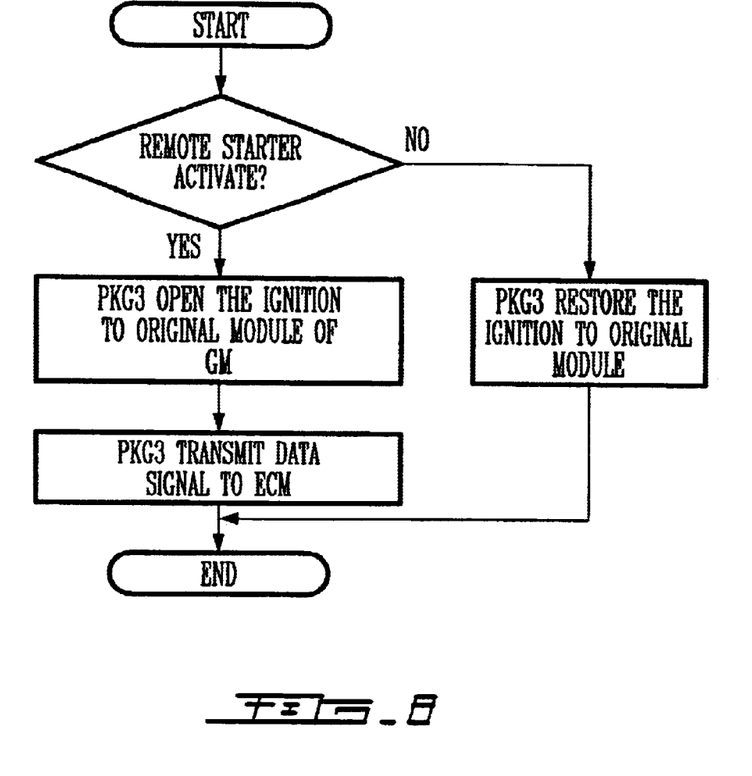
FIG. 8 is a flow diagram showing the logical algorithm of operation of the third illustrative embodiment of the remote starter pass-key module of the present invention, illustrated in FIG. 7.

A further illustrative embodiment of the pass-key module of the present invention for operation with a General Motors transponder based anti-theft system is illustrated in FIGS. 7 through 9. When remote starting system controller 22 is activated, providing a Lo output on GWR line 25, ignition line 44 to transceiver 31 is disconnected through transistor Q3 and timer U1 is energised through transistor Q2. The power supply section is not required since timer U1 can be operated directly from the 12V ignition supply. Upon application of a 12V supply at pin 8, timer U1 enters into an astable multivibrator mode and provides a train of pulses at output pin 3 at a frequency and duty cycle determined by the values of resistors R3 and R4 and capacitor C3. Output pulses are communicated to data output line 42 by NPN transistor Q1. Upon reception of such a pulse train conforming to a predetermined protocol, VCU 40 enables engine starting. Obviously, equivalent results would be obtained by using a programmable integrated computer instead of timer U1.

Therefore, It can be seen that the electronic pass-key module of the present invention can be advantageously used to interface practically any existing remote starting system to an anti-theft system equipped vehicle, without the limitations and drawbacks of the prior art solutions. A major characteristic of the PK module being that it bypasses the transceiver and does not require anybody to know a valid key ID code to install and operate the module.

The above described illustrative embodiments of the electronic pass-key module (PK module) for interfacing a remote starting system to anti-theft system equipped vehicles according to the present Invention present the advantage of overcoming limitations and drawbacks of the known solutions described in the background of the invention, and more specifically:

enable the retrofit installation of a conventional remote starting system on vehicles equipped with a transponder based anti-theft system;

are able to co-operate with a wide selection of conventional remote starting systems;

cannot be used by a thief to drive the vehicle and preserve the full usefulness of the anti-theft system;

can comply with variable password types of transponder based anti-theft systems;

do not require anybody to know the LO code of a valid key or card transponder or a password sent to a transponder by the vehicle control unit; and are economical to produce with commonly available electronic components.

Although the present invention has been described by means of illustrative embodiments thereof, it is contemplated that various modifications may be made thereto without departing from the spirit and scope of the present invention. For example, different embodiments of the pass-key module can be made to adapt to the communication and programming protocols of different anti-theft systems than those described hereinabove. Also, although the pass-key module has been described as an interface for a remote starting system, it is contemplated that use of the module can by made without a remote starting system by trigging the GWR input manually or with another type of controller to enable starting of the engine without having to introduce a valid key into the key cylinder assembly. Accordingly, it is intended that the embodiments described be considered only as illustrative of the present invention and that the scope thereof should not be limited thereto but be determined by reference to the claims hereinafter provided and their equivalents.

What is claimed is:

1. A pass-key electronic module for enabling a remote control system to activate a function of a motor vehicle equipped with an anti-theft system including a key identity sensor to transmit an identity code for validation to a vehicle control unit through a data communication link, comprising:

(a) a receiver circuit for receiving a command to activate the function of the motor vehicle from the remote control system, and a request from the vehicle control unit to transmit an identity code;

(b) a key identity sensor disabling circuit responsive to the command to activate the function of the motor vehicle to prevent the key identity sensor from communicating with the vehicle control unit;

(c) a memory circuit for storing an identity code for validation by the vehicle control unit; and (d) a communication circuit connected to the data communication link for transmitting the identity code stored in the memory circuit to the vehicle control unit in response to both the command from the remote control system and the request from the vehicle control unit, wherein validation of the identity code from the memory circuit by the vehicle control unit enables activation of the function of the motor vehicle.

2. A pass-key electronic module as defined in claim 1, further comprising a teaching means through which the identity code from the memory circuit is communicated to the vehicle control unit through the communication circuit and the data communication link, for storage and future recognition and validation by the vehicle control unit.

3. A pass-key electronic module as recited in claim 1, further comprising another memory circuit for storing and recalling a password communicated to the module by the vehicle control unit.

4. A pass-key electronic module as recited in claim 1, wherein the vehicle control unit and the key identity sensor are connected through a sensor enable line through which the request to transmit an identity code is supplied by the vehicle control unit, and wherein the key identity sensor disabling circuit comprises a switching unit connected to the sensor enable line and responsive to the command to activate the function of the motor vehicle to open the sensor enable line and thereby prevent the key identity sensor from communicating with the vehicle control unit.

5. A pass-key electronic module as recited in claim 1, wherein the remote control system comprises an output for emitting an ignition signal, and wherein the vehicle control unit supplies the request to transmit an identity code in response to the ignition signal.

6. A pass-key electronic module as recited in claim 2, wherein:

the motor vehicle comprises a key-insertion cylinder including the key identity sensor for detecting an identity code from a key inserted in the cylinder; and the teaching means comprises the communication circuit for transmitting the identity code from the memory circuit to the vehicle control unit within a predetermined time delay after the key has been inserted in the key-insertion cylinder, for subsequent recognition and validation of the identity code from the memory circuit by said vehicle control unit.

7. A pass-key electronic module as recited in claim 1, wherein:

the identity code stored in the memory circuit comprises a password transmitted by the vehicle control unit in response to receiving a request to stop said function of the motor vehicle; and the communication circuit retransmits the password to the vehicle control unit in response to both the command from the remote control system and the request from the vehicle control unit.

8. A pass-key electronic module as recited in claim 1, wherein each identity code comprises both a key identity code and a password transmitted by the vehicle control unit in response to receiving a request to stop said function of the motor vehicle.

9. A pass-key electronic module as recited in claim 1, wherein:

the identity code stored in the memory circuit comprises a train of pulses conforming to a predetermined protocol; and the memory circuit comprises means for reproducing said train of pulses.

10. A pass-key electronic module as recited in claim 9, wherein the memory circuit comprises, as the means for reproducing the train of pulses, a timer comprising resistor and capacitor means and operating in an astable multivrator mode for reproducing said train of pulses having a frequency and duty cycle determined by the resistor and capacitor means.

11. A pass-key electronic module as recited in claim 1, wherein the receiver circuit comprises means for receiving from the remote control system data forming the command to activate the function of the motor vehicle.

12. A pass-key electronic module as recited in claim 11, wherein the data from the remote control system comprises a ground signal.

13. A method for enabling a remote control system to activate a function of a motor vehicle equipped with an anti-theft system including a key identity sensor to transmit an identity code for validation to a vehicle control unit through a data communication link, comprising:

receiving a command to activate the function of the motor vehicle from the remote control system, and a request from the vehicle control unit to transmit an identity code;

disabling the key identity sensor from communicating with the vehicle control unit in response to the command to activate the function of the motor vehicle;

storing an identity code for validation by the vehicle control unit; and transmitting through the data communication link the stored identity code to the vehicle control unit in response to both the command from the remote control system and the request from the vehicle control unit, wherein validation of the transmitted identity code by the vehicle control unit enables activation of the function of the motor vehicle.

14. A method as defined in claim 13, further comprising teaching the stored identity code to the vehicle control unit through the data communication link, for storage and future recognition and validation by the vehicle control unit.

15. A method as recited in claim 13, further comprising storing and recalling a password communicated from the vehicle control unit.

16. A method as recited in claim 13, wherein:

the vehicle control unit and the key identity sensor are connected through a sensor enable line through which the request to transmit an identity code is supplied by the vehicle control unit; and disabling the key identity sensor from communicating with the vehicle control unit comprises opening the sensor enable line in response to the command to activate the function of the motor vehicle to thereby prevent the key identity sensor from communicating with the vehicle control unit.

17. A method as recited in claim 13, wherein:

the remote control system comprises an output for emitting an ignition signal; and the method further comprises supplying, through the vehicle control unit, the request to transmit an identity code in response to said ignition signal.

18. A method as recited in claim 14, wherein:

the motor vehicle comprises a key-insertion cylinder including the key identity sensor for detecting an identity code from a key inserted in the cylinder; and teaching the stored identity code to the vehicle control unit comprises transmitting the stored identity code to the vehicle control unit within a predetermined time delay after the key has been inserted in the key-insertion cylinder, for subsequent recognition and validation of said identity code by said vehicle control unit.

19. A method as recited in claim 13, wherein:

the stored identity code comprises a password transmitted by the vehicle control unit in response to receiving a request to stop said function of the motor vehicle; and transmitting the stored identity code to the vehicle control unit comprises retransmitting the password to the vehicle control unit in response to both the command from the remote control system and the request from the vehicle control unit.

20. A method as recited in claim 13, wherein each identity code comprises both a key identity code and a password transmitted by the vehicle control unit in response to receiving a request to stop said function of the motor vehicle.

21. A method as recited in claim 13, wherein:

the identity code stored in the memory circuit comprises a train of pulses conforming to a predetermined protocol; and transmitting the stored identity code to the vehicle control unit comprises reproducing said train of pulses.

* * * * *